July 31, 1962

H. K. BRADFORD 3,047,811

ACCEPTANCE CIRCUITS

Filed Dec. 2, 1960

INVENTOR.

HENRY K. BRADFORD

BY

Marechal, Biebel, French & Bugg

ATTORNEYS

United States Patent Office 3,047,811
Patented July 31, 1962

3,047,811

ACCEPTANCE CIRCUITS

Henry K. Bradford, Fairfax, Va., assignor to Outlook Engineering Corporation, Alexandria, Va., a corporation of Virginia Filed Dec. 2, 1960, Ser. No. 73,280
7 Claims. (Cl. 328—142)

This invention relates to acceptance circuits and more particularly to acceptance circuits wherein the signal level at acceptance and the range of the signal accepted can be readily and accurately adjusted.

It is a principal object of this invention to provide acceptance circuits which operate to effect an output signal upon the occurrence of an input signal lying within predetermined and adjustable values.

Another object of this invention is to provide acceptance circuits which have separate and independent adjustments for varying the level and the range of response.

A further object of this invention is to provide acceptance circuits including a coincidence circuit portion.

This invention has particular utility for use with the color detection and recognition system disclosed in the copending application of Young (Docket 3867), filed concurrently herewith.

Other objects and advantages of the invention will be apparent from the following description, the accompanying drawing and the appended claims.

In the drawing—

Figures 1, 2, 3:
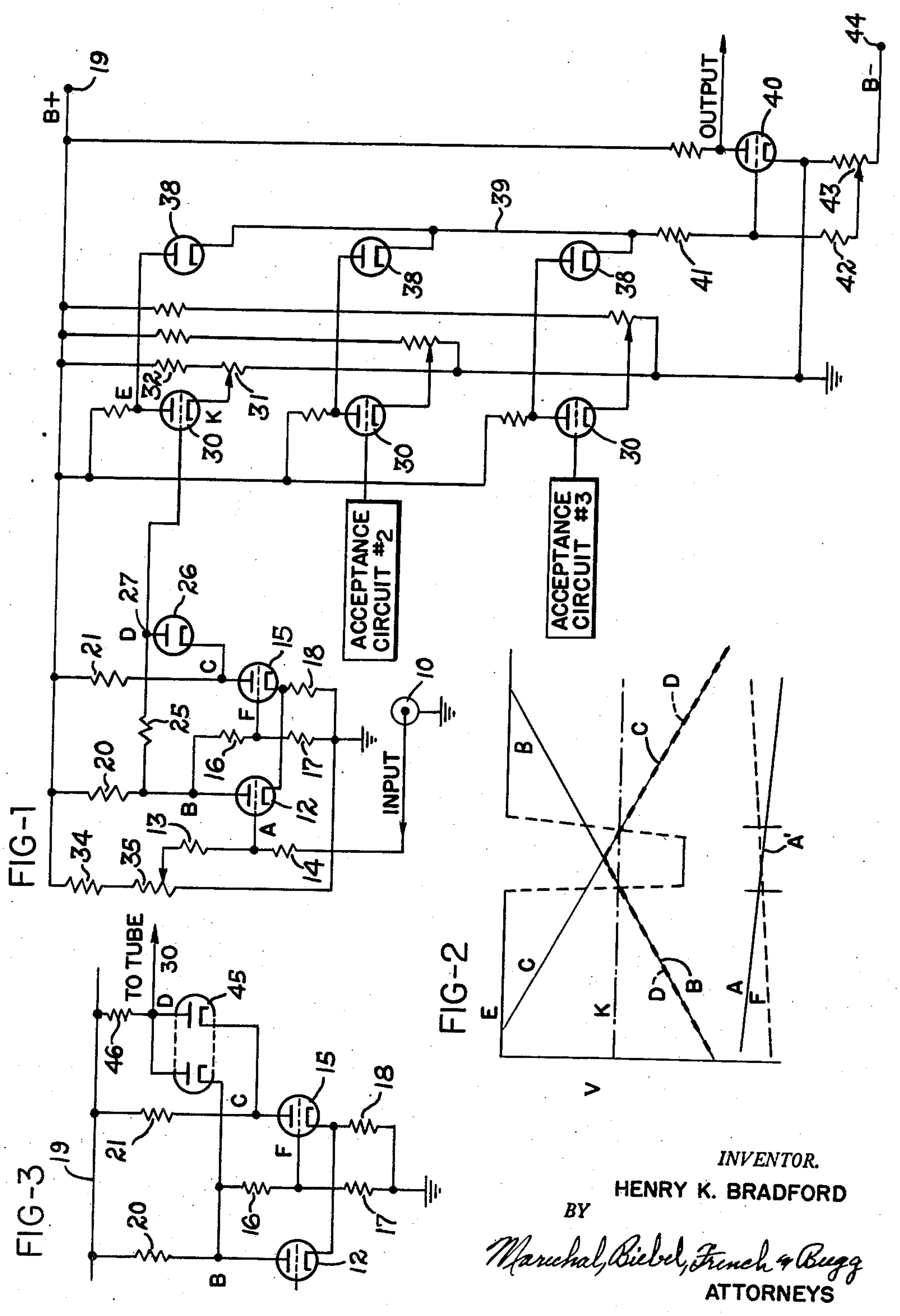
FIG. 1 is an electrical schematic diagram of this invention.
FIG. 2 is a voltage diagram which illustrates the interrelationship of the voltages at several points within the circuits of this invention.
FIG. 3 is a modification of a portion of the diagram of FIG. 1.

Referring to the drawing, which illustrates preferred embodiments of this invention, an input is shown at 10 in FIG. 1. An input voltage or signal, a particular value of which is to be indicated by this invention, is applied to the input 10. A portion of this signal is applied to the grid of a first amplifying stage, consisting of a triode tube 12, by means of a voltage divider including resistors 13 and 14.

The tube 12 operates as an amplifier and a phase inverter, and the inverted form of the input voltage is directly applied to the input grid of a second triode tube 15 through signal proportioning resistors 16 and 17. The purpose of the resistors 16 and 17 is to reduce the signal in proportion to the gain of the tube 12 so that the signal applied to the grid of the second tube 15 has substantially the same signal level, but in inverted relation, to the signal at the grid of the tube 12. The cathodes of the tubes 12 and 15 are connected to ground through a common cathode resistor 18, and their respective plates are connected to a source 19 of B+ through plate load resistors 20 and 21.

One-way conducting load means connected between the plates of the first tube 12 and the second tube 15 includes a series connected load or current limiting resistor 25 and diode 26. It will be seen that the diode 26 conducts throughout a portion of the value of the input voltage range and forms, at the junction 27 between the plate of the diode and the resistor 25, a signal which progressively increases to a peak and then decreases throughout a progressive change in the input voltage at 10. This signal is applied to the grid of a third amplifying stage consisting of a triode tube 30.

The triode 30 provides the output signal of the acceptance circuit and it is shown in this embodiment as forming an input to a coincidence circuit which is useful in determining the coincidence of acceptance by a plurality of similar acceptance circuits, each of which may be constructed according to the teachings of this invention. Means for adjusting the cut-off voltage of the output tube 30 in relation to its input at 27 to vary the width or range of acceptance in relation to the input signal at 10 consists of a potentiometer 31. The potentiometer 31 has its wiper connected to the cathode of the tube 30 and forms, with a fixed resistor 32, a voltage divider between the B+ source 19 and ground. Thus, the potentiometer 31 determines the voltage K and the point of conductance of the tube 30 in relation to the input signal D at the diode 26.

Means for adjusting the range of acceptance higher or lower in relation to the value of the input voltage consists of the voltage dividing network consisting of a fixed resistor 34 and a potentiometer 35 which is connected between the B+ and ground. The wiper of the potentiometer 35 is connected to supply an adjustable voltage to the input grid of the tube 12 which may be in subtractive or additive relation to the input signal at 10.

The coincidence circuit portion consists of three substantially identical circuits each including a triode tube 30, adjustable bias means in the cathode circuits for determining the width of acceptance and each further includes an isolation diode 38 by means of which their plates are connected in common to a lead 39. The lead 39 is connected to the grid of a coincidence output tube 40 through a voltage divider consisting of the resistors 41, 42 and a potentiometer 43 which is connected to a source 44 of B—. The cfathode of the tube 40 is grounded.

The operation of the invention shown in FIG. 1 can best be understood by reference to the voltage diagram of FIG. 2, where the input voltage to the first amplifying section, which may be taken as representing the input signal in form at 10, is shown at A as uniformly decreasing from a high to a low value, for the purpose of illustration. It is desired that a certain range of values of the voltage A be accepted and any voltage higher or lower than this range be rejected. This desired range is indicated at A′ in FIG. 2. The input at A is amplified and inverted by the first tube section 12 resulting in the signal indicated at B in FIG. 2. This signal is divided by the gain of the tube by the voltage divider consisting of the resistors 16 and 17 and is applied in inverted form at F to the second tube section. The same thing in reverse takes place at the plate of the tube 15 and this is plotted by the line C.

The voltage represented by the broken line D is that measured at the plate of the diode 26, and it is also the signal applied to the grid of the tube 30. When the voltage at C is high and the voltage at B is low the voltage at D will be the same as that at B since the diode 26 will be cut off and not conducting. But, as the voltage at B rises and C falls, a point is reached where the voltage at C is less than that at B and the diode then begins to conduct. Therefore, the voltage at D will follow the voltage at C due to the conduction of the diode at all times when the voltage at B is greater than C. The load resistor 25 limits the current through the diode 26 during the conducting portions when B is greater than C.

It will therefore be seen that the voltage at D consists of a voltage which uniformly increases to a peak value and then decreases with a progressive change of the input signal throughout the intended range designated at A′, and applies this voltage to the grid of the tube 30. The bias of the tube 30 is adjusted at the potentiometer 31 to provide a voltage K at its cathode defining thereby the cut-off point of the tube in relation to the voltage D. Accordingly, the range of conduction of the tube 30 in relation to the input voltage A is determined by the setting of the voltage K at the potentiometer 31.

The voltage E at the plate of the tube 30 is normally high due to the fact that the tube is not conducting.

However, during conduction throughout the range A′, the voltage at E is sharply decreased, as indicated in FIG. 2.

During non-conduction of the tubes 30, the grid of the output tube 40 is held above cut-off by reason of the current flow through the isolation diodes 38 and the resistor 42 to ground. The non-conduction of any one or two of the tubes 30 at the range A′ is not sufficient to cut off output tube 40. However, with the conduction of all of the three tubes 30, the flow through the resistor 42 is substantially decreased and the tube 40 is cut off, thus indicating the condition of coincidence at the inputs to the coincidence circuit portion of this invention. The sharp rise in voltage at the plate of the tube 40 signals the occurrence of coincidence.

FIG. 3 shows a modified portion of the circuit of FIG. 1 consisting of a balanced arrangement of the one-way conducting means connected between the plates of the tubes 12 and 15. This embodiment includes a pair of one-way current conductors which may conveniently take the form of a dual diode tube 45. The tube 45 has one of its cathodes connected to the plate of the first triode 12 and the other of its cathodes connected to the plate of the second triode 15. The plates of the diode 45 are connected in common to the grid of the tube 30 and also to the source 19 of B+ voltage through a load resistor 46.

The operation of this embodiment is substantially as described above in connection with FIG. 1 except that one-half of the tube 45 conducts during the time in which the voltage C is greater than at B and the other half of this tube conducts when the voltage at B is higher than the voltage at C. It will therefore be seen that the voltage at D which is applied to the grid of the tube 30 will follow the voltage at B at all times when C is greater than B due to conduction through the left half of the tube from D to B. The voltage at D will then follow the voltage at C during all times when B is greater than C due to conduction through the right half of the tube from D to C. Thus the voltage at D will rise and fall with a progressive change in the voltage at A in the manner described in connection with the embodiment of FIG. 1.

It is therefore seen that this invention provides acceptance circuits which are both simple, versatile and stable. In each embodiment the output signal of the diode means consisting of the input to the tube 30 always follows the lower of the outputs of the first and second amplifying stages. The range of acceptance is accurately defined and may be readily varied from broad to narrow by suitably adjusting the potentiometer 31 which varies the voltage K. Separate control is provided for adjusting the operation of the invention with respect to the signal level at the input to the circuit. This is effected by the suitable positioning of the potentiometer 35 to vary the voltage at A. The invention is particularly useful for determining when a plurality of parameters fall within predetermined assigned and adjustable ranges, and for further determining the coincidence of the parameters in such ranges. For instance, the invention has utility in tristimulus video applications to detect the occurrence of a plurality of varying stimuli falling within predetermined values and the fact of coincident detection.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A circuit for providing an output signal in response to an input voltage falling within a predetermined range comprising a first amplifying stage having an input connected to receive said input voltage, a second amplifying stage having an input connected to receive an inverted form of said input voltage from the output of said first stage, one-way conducting means connected between the outputs of said first and second stages providing a signal which follows the lower of the said outputs of said stages, and an output amplifying stage having an input connected to receive said signal and arranged for conduction only above a predetermined maximum value of said signal.

2. A circuit for responding to an input voltage falling within a predetermined adjustable range, comprising a first tube having an input grid connected to receive said input voltage, a second tube having an input grid connected to receive an inverted form of said input voltage from the plate of said first tube, a one-way conducting diode means connected including connections to the plates of said first and second tubes and arranged to provide a signal which follows whichever plate voltage of said first and second tubes is lower, and an output tube having a grid connected to receive said signal at said means, and means for adjusting the cut-off voltage of said output tube in relation to said signal to vary the range of conductance of said output tube in relation to a predetermined range of said input voltage.

3. An acceptance circuit for providing an output signal in response to an input voltage falling within a predetermined range comprising a first tube having an input grid connected to receive said input voltage, a voltage divider connected to the plate of said first tube, a second tube having an input grid connected at said divider to receive an inverted form of said input voltage at substantially its original level, one-way conducting means connected between the plates of said first and second tubes for conduction forming an alternately increasing and decreasing signal with a progressive change in the input voltage through said predetermined range, and an output amplifying tube having a grid connected to receive said signal at said means and biased for conduction at and above a predetermined maximum value of said signal.

4. An acceptance circuit for providing an output signal in response to an input voltage falling within a predetermined range comprising a first tube having an input grid connected to receive said input voltage, a voltage divider connected to the plate of said first tube, a second tube having an input grid connected at said divider to receive an inverted form of said input voltage at substantially its original level, one-way conducting means connected between the plates of said first and second tubes for conduction therebetween when the plate of said first tube is at a higher voltage than the plate of said second tube and forming an alternately increasing and decreasing signal with a progressive change in the input voltage through said predetermined range, and an output amplifying tube having a grid connected at said load resistor and biased for conduction at and above a predetermined maximum signal at said conducting means.

5. An acceptance circuit for providing an output signal in response to an input voltage falling within a predetermined range comprising a first tube having an input grid connected to receive said input voltage, a second tube having an input grid connected to receive an inverted form of said input voltage from the plate of said first tube, a series connected diode and current limiting resistor connected between the plates of said first and second tubes for conduction throughout a portion of the value of said input voltage and forming at said diode an alternately increasing and decreasing signal with a progressive change in the input voltage, and an output amplifying stage having an input connected at said diode and biased for conduction at and above a predetermined signal at said load resistor.

6. An acceptance circuit for responding to an input voltage falling within a predetermined adjustable range comprising, an adjustable voltage divider, a first tube having an input grid connected to receive said input voltage through said adjustable voltage divider for varying the point at which acceptance occurs in relation to said input voltage, a second tube having an input grid connected to receive an inverted form of said input voltage from the plate of said first tube, a diode connected between the plates of said first and second tubes for conduction throughout a portion of the value of said input voltage and forming at the diode plate an alternately and uniformly increasing and decreasing signal with a progressive change in the input voltage through said predetermined range, an output amplifying tube having a grid connected to receive said signal, and adjustable resistance means in the cathode circuit of said output tube for varying the cut-off point of said tube in relation to said signal to vary the acceptance width of said circuit.

7. A circuit for responding to an input voltage falling within a predetermined adjustable range comprising, a first tube having an input grid connected to receive said input voltage, a second tube having an input grid connected to receive an inverted form of said input voltage from the plate of said first tube, a pair of diodes each having a cathode connected to a separate one of the plates of said first and second tubes and plates connected in common to a source of B+ forming at the said diode plates a signal which alternately increases and decreases with a progressive change in the input voltage through said predetermined range, and an output amplifying tube having a grid connected to receive said signal for conduction during a portion thereof.

No references cited.